US011809592B2

(12) United States Patent
Ranger et al.

(10) Patent No.: US 11,809,592 B2
(45) Date of Patent: Nov. 7, 2023

(54) DATA PROCESSING APPARATUS AND METHODS

(71) Applicant: WORLD DATA EXHANGE HOLDINGS PTY LTD, Sydney (AU)

(72) Inventors: Julian Ranger, Surrey (GB); Gavin Ray, Surrey (GB); Ben Hogan, Surrey (GB); Martin O'Neal, Surrey (GB)

(73) Assignee: WORLD DATA EXCHANGE HOLDINGS PTY LTD, Sydney (AU)

( * ) Notice: Subject to any disclaimer, the term of this patent is extended or adjusted under 35 U.S.C. 154(b) by 573 days.

(21) Appl. No.: 16/494,396

(22) PCT Filed: Mar. 19, 2018

(86) PCT No.: PCT/EP2018/056903
§ 371 (c)(1),
(2) Date: Sep. 16, 2019

(87) PCT Pub. No.: WO2018/167328
PCT Pub. Date: Sep. 20, 2018

(65) Prior Publication Data
US 2020/0134229 A1  Apr. 30, 2020

(30) Foreign Application Priority Data
Mar. 17, 2017 (GB) ..................... 1704320

(51) Int. Cl.
*G06F 21/62* (2013.01)
*G06F 16/16* (2019.01)
(Continued)

(52) U.S. Cl.
CPC .......... *G06F 21/6245* (2013.01); *G06F 16/13* (2019.01); *G06F 16/164* (2019.01);
(Continued)

(58) Field of Classification Search
CPC .... G06F 21/6245; G06F 16/13; G06F 16/164; G06F 2221/2137; G06F 16/283;
(Continued)

(56) References Cited

U.S. PATENT DOCUMENTS 9,727,206 B2 * 8/2017 Hu .......................... H04W 4/50
10,600,421 B2 * 3/2020 Yang ....................... H04W 4/16
(Continued)

FOREIGN PATENT DOCUMENTS

WO  WO2014133479  9/2014
WO  WO2015076846  5/2015

OTHER PUBLICATIONS

European Patent Office, International Search Report for PCT/EP2018/056903, dated Aug. 31, 2018.
European Patent Office, Written Opinion for PCT/EP2018/056903, dated Aug. 31, 2018.

*Primary Examiner* — Sanchit K Sarker
(74) *Attorney, Agent, or Firm* — Crowell & Moring LLP

(57) ABSTRACT

A system and method are disclosed for storing, processing and retrieving information. A data store, a data recipient and a data processing machine are provided, the data store and the data recipient both being connectable to each other and to the data processing machine via a potentially insecure communications network, and the data store being adapted to selectively provide information to the data processing machine and to the data recipient on receipt of one or more suitable instructions from the data processing machine, and the data processing machine being adapted to provide instructions to the data store based on a set of pre-determined rules, so that information is provided by the data store to the data recipient only when pre-determined conditions are met. Also disclosed is a data processing system comprising a processor and a data store, the processor being adapted to convert information into a pre-determined form (Continued)

for storage in the data store, wherein the processor is further adapted to categorise said information according to its content according to a set of pre-determined rules, and subsequently retrieve information from the data store, the data store comprising a data surface and a file storage means, wherein the data surface comprises a description of information stored in files in the file storage means.

10 Claims, 2 Drawing Sheets

(51) Int. Cl.
  *G06F 16/13*     (2019.01)
  *H04L 9/40*      (2022.01)
(52) U.S. Cl.
  CPC ........ *H04L 63/0428* (2013.01); *H04L 63/061* (2013.01); *H04L 63/108* (2013.01); *G06F 2221/2137* (2013.01)

(58) Field of Classification Search
  CPC ... G06F 16/10; H04L 63/0428; H04L 63/061; H04L 63/108; H04L 63/102
  See application file for complete search history.

(56) References Cited

U.S. PATENT DOCUMENTS

| | | | |
|---|---|---|---|
| 2012/0136936 A1* | 5/2012 | Quintuna | G06F 21/6245 709/204 |
| 2014/0181954 A1* | 6/2014 | Robertson | G06F 21/31 726/17 |
| 2014/0215638 A1* | 7/2014 | Nicolas | G06F 21/6272 726/27 |
| 2015/0293858 A1* | 10/2015 | Raam | G06F 21/78 713/193 |
| 2016/0104008 A1* | 4/2016 | Lacey | G06Q 30/0251 726/28 |
| 2016/0179849 A1 | 6/2016 | Dubois | |

* cited by examiner

DATA PROCESSING APPARATUS AND METHODS

CROSS-REFERENCE TO RELATED APPLICATIONS

This application claims the benefit under 35 U.S.C. § 371 of International Application No. PCT/EP2018/056903, filed Mar. 19, 2018, which claims the priority of GB Patent Application No. 1704320.9, filed Mar. 17, 2017.

FIELD OF THE INVENTION

The present invention relates to data processing apparatus and methods.

BACKGROUND ART

In the commercial internet arena it is common for websites to collect information about their users. For example, many websites require users to register certain information before gaining full access to the site in question. This information may be basic contact information, or may be fuller demographic and personal information, depending on the site in question.

It is also common for users to wish to share their personal information as well as media content. For many users, there is a trade-off between sharing personal information in return for access to a service without payment. This is common in, for example, social networking sites or search engines where users may interact with members of their network or obtain useful search results free-of-charge with the processing and infrastructure being funded by advertising sales. The quality, and hence commercial value, of advertising sales is improved by maximising the potential relevance to a user by obtaining as much information as possible about the user and then selecting the best matching advertising accordingly.

However, the harvesting of user information is not without limit, as the use of personal information is heavily regulated in some jurisdictions, and some users are cautious or even fearful about revealing personal information to a site from which it may then be distributed further without explicit or informed consent being obtained from the user.

Recent media coverage has highlighted privacy concerns when data collected for one alleged purpose is bought or acquired by another enterprise and then used for a different purpose, either intentionally or unintentionally.

It is therefore clear that there is a level of demand for more secure storage, control and tracking of the distribution of personal data.

SUMMARY OF THE INVENTION

A first aspect of the present invention is directed to a system comprising a user device, controlled by a user, a data store, containing data generated by or relating to the user, a data recipient, and a data processing machine, the user device being a programmable computing device comprising a first application under the control of the data recipient, and a second application not under the control of the data recipient, the user device, the data recipient, and the data processing machine being connectable to each other via a communications network, the data store having a physical manifestation that is distinct from that of the data recipient, and being connectable to the user device and the data processing machine via the or a communications network, wherein the first application is controllable by the data recipient to present a data request to the second application, and the second application is programmed to refer the data request to the data processing machine for validation against a set of pre-determined rules, and if the data request is validated, the data processing machine provides the data to the data recipient.

The data store may retain information pertaining to an individual user or a group of users. Such information may comprise personal details such as date of birth and gender and so on, as well as a wide range of information in different categories. For example a user may choose to include information relating to his or her health, or personally-generated content such as photos and messages and so on.

Selective provision of information to the data processing machine may be put into effect in a number of ways. An important factor is that the information which is provided by the data store to the data recipient comprises only information which has been explicitly approved for provision by a user. Thus, the user may control what information is provided and what information is kept confidential. The pre-determined rules are based on the user's preferences. They may also be based on legal and regulatory requirements that define the terms and conditions of data sharing, the rules for protecting, handling and (eventually) destroying the shared data, and the legal definition of the purpose of the sharing agreement.

The user device can be a portable computing device, but the invention is equally applicable to other forms of computing devices.

The validation step can also include the step of presenting the data request to the user via the second application, for approval or otherwise by the user. The request can be presented in a standardised form.

The physical manifestation of the data store is preferably also distinct from that of the data processing machine.

According to the invention, the data processing machine need not retain a copy of the data provided to the data recipient. Instead, the data processing machine can arrange for the data to be sent to the data recipient by providing instructions to effect communication or otherwise facilitate movement of the data from the data store to the data recipient.

The data processing machine may interpret the pre-determined rules in order to provide corresponding instructions to the data store.

In one example, a connection between the data store and the data processing machine and between the data store and the data recipient may be formed only when a user instructs such a connection to be formed. Such a connection is temporary, being disconnected shortly after having been formed. This arrangement minimises any possibility of a connection being intercepted, spoofed (forged), subsequently replayed or otherwise interfered with, for example.

Thus, information is only provided to the data recipient in the manner and at the time determined by the user.

The data processing machine may be provided by a first service provider. The data store may be located on a machine owned or controlled or operated by the user. Alternatively the data store may be provided by a second service provider.

The data processing machine and/or the data store may be part of a distributed networked storage and processing system, i.e. they may be part of a cloud-based arrangement. Thus, the data processing machine may be provided by a first service provider, and the data store is located on a physical manifestation that is owned or controlled or operated by the user The data processing machine may remove information relating to the information, the rules and/or the instructions substantially immediately after a connection has been closed.

Thus, any records relating to such a transaction only exist temporarily. This reduces any risk of information relating to a transaction being intercepted or interfered with. Data relating to transaction logging may be retained for the purpose of audit, service verification or remedial diagnostics. No personally identifiable data need be retained for this process.

The data store may be arranged so that on receipt of a suitable instruction it makes available only information related to that instruction. For example, a data store may include a large amount of information belonging to and relating to a user. The user may wish to share certain information with a data recipient but not all the information within the data store. The classification, volume and exact specification of this data may be subject to a data descriptor. Thus, an instruction may enable the data store to provide only information which the user decides (and agrees) to share at that point in time.

The instruction may take the form of a token, preferably unique, which provides time-limited access to the information, meeting a definition of such a data descriptor, from the data store to the data recipient.

Such a token may be issued by the data processing machine to the data recipient on instruction by a user. The data recipient may then pass the token to the data store to authenticate its access. The token may also include data relating to the data recipient, so that only the data recipient may obtain the information from the data store.

This aspect of the invention also relates to a method for controlling the provision of information from a data store to a data recipient within constraints controlled by a user, wherein there is a user device, a data store containing data generated by or relating to the user, a data recipient and a data processing machine, the data store and the data recipient both being connectable to each other and to the data processing machine via a communications network, comprising the steps of:

providing, on the user device, a first application under the control of the data recipient, and a second application not under the control of the data recipient:
forming a connection between the data store, the data recipient and the data processing machine, ideally a secure and user authenticated connection;
and wherein
under the control of the data recipient, the first application sends a data request to the second application,
the second application forwards the data request to the data processing machine
the data processing machine attempts to validate the data request against a set of pre-determined rules, and, if validation is successful, the data processing machine provides the data recipient with access to a defined subset of the information held in the data store; and
the connection is closed.

The data store, the data recipient and the data processing machine will preferably be separated. Ideally, this will be separation through some or all of ownership by a different commercial entity, by location within a different security domain, and by physical location at a different place.

The method may further comprise the step of destroying any temporary copies of data and/or contextual data.

Steps taken as part of the first aspect of the present invention may be as follows:
1) the data recipient requesting a session key from the data processing machine;
2) the data processing machine issuing a session key, preferably unique, to the data recipient;
3) using the session key to request information from the data store;
4) the data store interpreting the request for information and providing a list of available files according to the request for information;
5) the data recipient requesting one or more available files according to the list of available files and the request for information.

Encryption may be used to ensure that one or more of the request for information, the list of available files and the available files are transferred between the data store and the data recipient without also disclosing information to third parties. We prefer to use asymmetric encryption, to ensure that the data recipient is the only party able to decrypt the shared data (such as by means of a protected secret decryption key). Available files are not decrypted and re-encrypted before or during any transfer between the data store and the data recipient. This can be achieved by asymmetrically encrypting the file encryption key, and storing it in the file headers. Thus, encrypting for a data recipient means that the only step needed is to add a new re-encrypted file header and a decryption/re-encryption is unnecessary. This assists in maintaining trust in the architecture.

The above features of the invention also mean that insecure communications network(s) may be employed.

A second aspect of the present invention is directed to a data processing system comprising a processor and a data store, the processor being adapted to convert information into a pre-determined form for storage in the data store, wherein the processor is further adapted to categorise said information according to its content according to a set of pre-determined rules, and subsequently retrieve information from the data store, the data store comprising a data surface and a file storage means, wherein the data surface comprises a description of information stored in files in the file storage means.

By converting information into the pre-determined form, the information can be stored in a content neutral manner. That is, information can be categorised, stored and later processed so that the processing can take place without reference to the substance of the information stored. That way, selected sub-sets of the overall information can be manipulated or retrieved for further manipulation without the data processing system having regard to the information which is being processed.

For example, if retrieval from the data store of anonymised personal data is required then the processor can retrieve the relevant data from the data store without also retrieving data connecting the relevant data to information which could identify the person to whom the data relates.

The pre-determined form may comprise a set of types of information to be stored. Information to be stored may thus be stored, according to its type, within the data store. The information as such may be separated from data relating to the source of the information or its author.

The data surface may comprise data relating to the amount of information stored in each category within the data store. The data surface may further comprise further data describing aspects of the information within the data store. For example, the data surface may comprise data relating to the most recent version of each file stored in the data store.

The data surface may be a small fraction of the size (in terms of storage required) of that of the information held in the data store. This arrangement means that manipulation of the data surface requires less computer processing than an equivalent manipulation the information itself.

The data surface may contain further data to describe a data source and/or credentials of the user that were used to incrementally add data to the data store. This has the purpose of allowing the data store to define with full authority and necessary credentials how it may be kept up to date with time expanding (growing) external data sources that shall be periodically drawn into the data store by autonomous data processing apparatus.

The data surface is constructed in a manner that provides certain information about the content of the data store to facilitate faster, more efficient, or more specific processing of its contents without the need to read the data itself.

The information itself may be encrypted substantially at all times, so that the data processing system may convert, categorise and retrieve information without the information itself being revealed at any stage. Furthermore, the data surface and the information itself may be encrypted separately so that decryption of the data surface does not reveal any of the information itself. This adds a layer of information security beyond, for example, a known encrypted drive—in which either all of the information is available or none is available, depending on whether the drive itself is encrypted or decrypted.

When new information is to be stored, the data processing system of the second aspect may carry out the following steps:
1) identify and categorise information to be stored;
2) assign one or more identifier codes to the information;
3) place the information in a directory according to its identifier;
4) create a log entry in a record.

When information meeting a selected set of criteria is to be retrieved, the data processing system of the second aspect may carry out some or all of the following steps:
1) analyse a record to ascertain what information is stored;
2) according to the results of the analysis of the record, provide a list of available information which meets the selected set of criteria according to one or more identifier codes;
3) in reply to the list, receive a request for at least one piece of information;
4) provide the at least one piece of information;
5) create a log entry in the record.

The record may be part of the data surface. The information may be stored in the data store.

The log entries are important to provide an efficient storage, processing and retrieval system. The log entries enable the data surface to provide an accurate list of available information. In this way the data surface may also be able to provide further information when needed, for example when the information was most recently updated, when the information was most recently synchronised with its datasource, the total amount of information store of each category, the number of individual items of information, and the like. The log entries may be stored in a suitable journal.

Such an arrangement reduces processing demands and also allows for an efficient synchronisation of information between devices, if desired. This may be especially useful if, for example, a user wishes to keep control of his or her information on a device controlled by the user but also wishes to from time to time share some of this or her information with a third party.

The data processing system of the second aspect is also flexible enough to adapt to changing circumstances. For example, if a new type of information or category of information is developed then a new (and preferably unique) identifier code can be created for the categorisation of that information and subsequent storage.

The skilled reader will appreciate that the first and second aspects of the present invention may be put into effect in synergy with each other to provide an overall system which combines all of the advantages of both aspects.

BRIEF DESCRIPTION OF THE DRAWINGS

An embodiment of the present invention will now be described by way of example, with reference to the accompanying figures in which.

DETAILED DESCRIPTION OF THE EMBODIMENT

The present invention seeks to define a way in which users can share data, under their complete control, via an information sharing management structure which we refer to as 'Consent Access' or 'CA'. This is to be contrasted with the existing model which has arisen through custom and opportunity, by which an online system that is given access to a particular data store typically has access to the entirety of that store and can retain that data at will.

Figure 1:
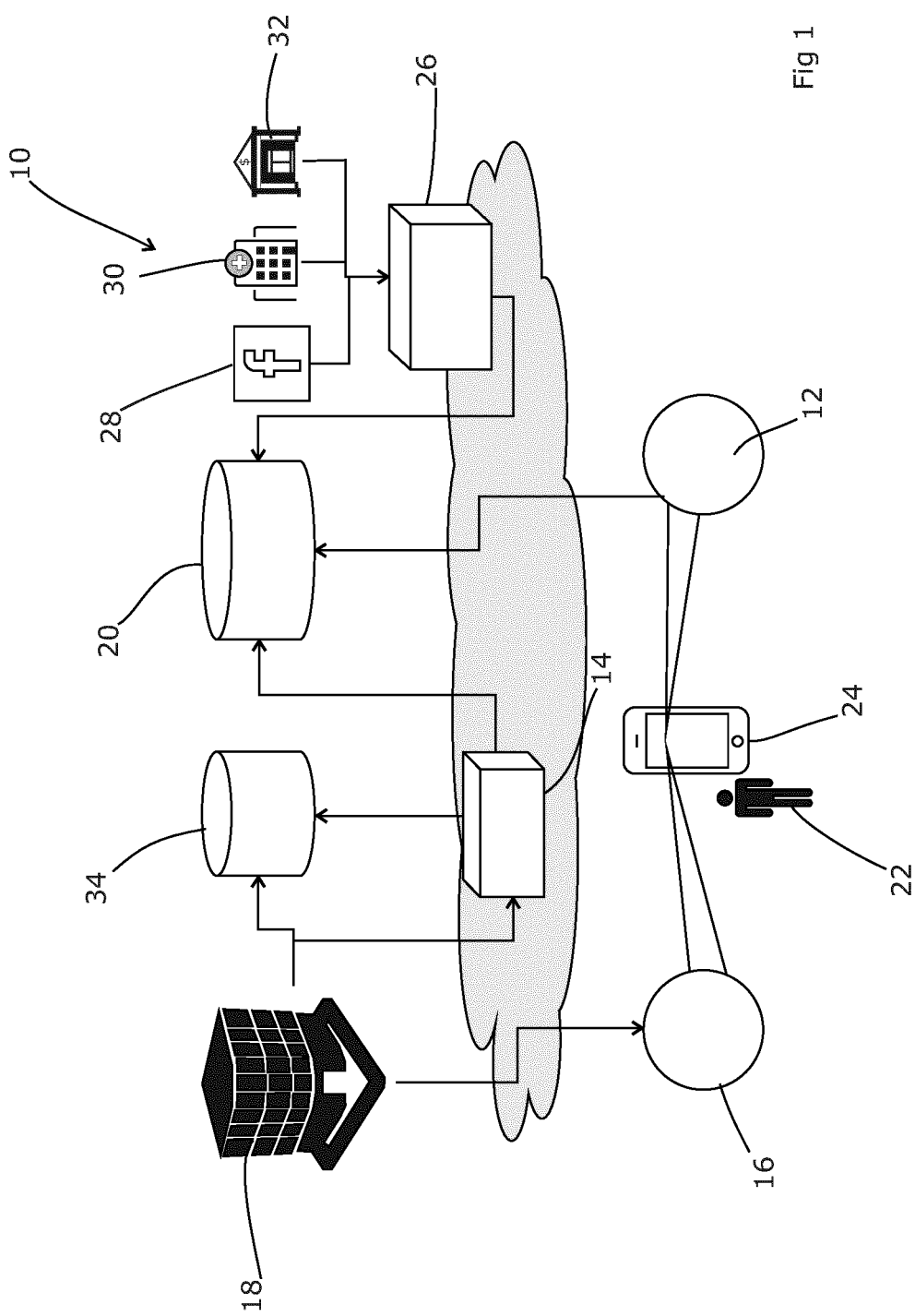
FIG. 1 illustrates the operative relationships of the present invention.

The Consent Access approach is shown in FIG. 1, and seeks to separate the management of data 10 (via an app 12) from the way in which that data can be shared, under explicit contract, with 3rd parties via a Consent Access Service (CAS) 14. FIG. 1 illustrates how the separation of a 3rd party app or website 16 is made between the 3rd parties server function 18, the system operator CAS subsystem 14 and the users data storage which is under their own personal cloud (or 'pCloud') storage infrastructure 20.

The pCloud 20 is provided by the user 22 and is under their control, both in practice and for the purpose of legal jurisdiction. It may be any suitable cloud storage system—current examples include the Dropbox, OneDrive, and GoogleDrive systems along with personally-hosted storage devices that can be placed online. A cloud-based synchronisation engine 26 is provided by the system operator and has access via the usual credentials to the user's pCloud and to online services 10 of the user such as their social media accounts 28, health data 30, finance data 32, and the like. Access is granted by the user and is therefore under the control of the user, with only those areas that the user is content to share in a controlled manner being included. The sync engine 26 then archives the data 28, 30, 32 from the online services 10 into the pCloud 20. This first provides an accessible backup for the user of their own data, independent of the choices that may be made from time to time by the providers of the various online accounts. It also provides a single repository that can be accessed by the CAS 14.

The CAS 14 is a separate cloud service, accessible by the $3^{rd}$ party 18 and with access to a contract database 34 storing details of the contract terms for the $3^{rd}$ party 18. It is able to retrieve data from the pCloud 20, or (alternatively) to instruct the pCloud to grant access for the $3^{rd}$ party to specific data in the pCloud, or to provide the 3$^{rd}$ party with access rights enabling it to access specific data from the pCloud. In practice, these alternatives are functionally equivalent.

Thus, a user 22 with a computing device 24 (in this example, a smartphone) is running an app 16 provided by the third party, referred to elsewhere as the "first application". The app 16 may be an item of application software running on the user's device 24, or it may be a website that has been visited by the device 24 and which contains suitable code. Either way, we will refer to the code as the 3$^{rd}$ party app 15 or the 'first application'. It is provided by a 3$^{rd}$ party having its own online infrastructure 18, and a contractual relationship with the system operator which governs the manner in which access is to be granted to data of the user 22.

As and when the 3$^{rd}$ party application 16 requests data from the user 22, it invokes the system operator's app 12 (or the "second application" referred to elsewhere) which then refers the request to the CAS 14. This validates the requestor and the request against the contract database 34, to ensure that the requestor is indeed the 3$^{rd}$ party 18 and that the data is available in the pCloud 20. We generally require a certificate to be held by the 3$^{rd}$ party app and supplied to establish the connection to the CAS (CA Service). This certificate authenticates the requestor, then the request itself is validated against the contract database. A data access consent is then presented to the user via the system operator's app 12, in a standard format, which is populated with information from the contract database explaining what data will be taken, and on what terms. The user can then make an explicitly informed choice as to whether or not to share the data 10. If they approve the request, then the CAS 14 takes the necessary steps to share the data 10.

The way in which data moves and the access credentials are managed all falls under what we refer to as the Consent Access Security Model (CASM). We have created our own naming models to define the key elements of this system and how it is managed;

Contract A specification of the data to be shared with 3rd parties under the PA model. Where the explicit statements dictate the inviolate terms of the data sharing: maximum data historic depth, types of data, data filtering rules (eg "abc*"), the period for which the data can be stored, what the data is for, whether the data can be shared, and the legal terms & conditions of the requestor.

3rd Party App A third party is a commercial partner of the entity operating the system, who has registered a contract with the system operator under which users will be asked for their consent to all or parts of the data defined in the contract to be shared with the 3rd party CAS Consent Access Service that acts as a memoryless transaction server that sees and retains no user data, its only function is to accept requests and execute them as a dedicated user proxy.

CASM Consent Access Security Model that defines the entire system security standards, models and protocols.

Contract Database The secure subsystem that stores all definitions of contracts agreed between the system operator and 3rd parties to define their data requests to users.

pCloud The online personal cloud storage service that holds the User Library, typically based on mainstream providers like Dropbox, OneDrive, GoogleDrive, iCloud User Library The storage system in proprietary digi.me (JSON FileSystem, or JFS) format that holds all social, finance, health, etc data The CASM (Consent Access Security Model) defines the operating procedures, functional requirements of security components and the transactional exchanges between all parties, processing and information sets. This breaks down into a number of general areas, as follows.

In relation to authentication, all 3rd parties must be authenticated. Secure end-point authentication must be implemented in all exchanges between the system operator infrastructure and 3rd party subsystems and applications. All contracts that are exchanged must be authenticated; secure signatures are generated to allow independent validation of the contents of a contract. Further, all applications must be authenticated; applications making Sync and CA requests must be authenticated to the system operator cloud services.

General rules for access control are that all public interfaces must be protected by firewall rules appropriate to the external user class. Hence, open interfaces must be minimised, and firewall rules must ensure only contracted 3rd parties can access CAS datasharing interfaces. All interfaces will typically require suitable protection from external aggressors' profiling/fuzzing, so protection measures should preferably ensure that two stage transactions are used to prevent randomised attacks gaining insight into a single interface.

Authorisation should be limited to valid applications, and valid versions of those applications. Pre-release and deprecated software releases should not be able to access public system operator services. Contracts should be both authentic and valid at the point of use—contracts should not be will be accepted if they are expired, abused, or blacklisted.

Data exchanges should be encrypted to a stated level of integrity, by default a 256 bit AES standard. Key exchanges should be subject to compliance with a suitable asymmetric encryption standard.

Accounting transactions should be recorded with a statement of detail level, action, outcome, warning status, so logging should record date/time, resource ID, activity, status, warning level.

To protect user identities, the system should not store user identity data in the same system as user identifiable data. User names, email and IP address data should not be stored with the system operator User.ID data. Where user registration interfaces capture personal user data, it is forwarded to a marketing contact database to be stored separately.

CA Contract structure is essentially an explicit permission statement. Thus, a consent access (CA) contract is a standardised short-form document that can be presented easily to a user, that is based upon an explicit definition of all necessary and sufficient terms to define both the request for data, its permitted use and the commitment by a 3rd party in receipt of it to retain and destroy that data. A contract is created via a commercial process between the 3rd party and the system operator. The legal and commercial contract records and electronic CA contract itself are stored within a CA Contract Database in the system operator systems.

The CA contract is based upon a small number of key content terms;

| | |
|---|---|
| Requestor | The 3rd party who is the registered counterparty to the contract. |
| Dataset | The type of data which the 3$^{rd}$ party wishes to share, such as social media data, health data, etc, and (potentially) one or more subsets within that dataset. |
| Date Range | From & to dates for the data in question. |
| Will share | A True/False flag, to either indicate a commitment to not share the data or to alert the user that data may be shared. |
| Purpose | An explanation of usage, to appear in user interfaces. |
| Access Type | Either 'Single', to indicate that the data request is a one-off transaction, or 'Periodic' to indicate that access may be repeated up until the expiry of the contract. |
| Contract Start | A date/time from which the data access shall be permitted |
| Contract Expiry | A date/time after which no more data access shall be permitted. |
| Status | To indicate contract status as active, pending future activation, blacklisted, revoked, expired |
| Signature | A validation of trust anchor and contract signature to prevent forgery, such as an X.509 certificate. |

The contracts should:

1. be stored in a secure database with full backup and security protection
2. backup should be subject to geo-diversity, with no single failure able to destroy all copies of the current database
3. be available for management, view and audit via a reporting and validation database
4. have a definitive commercial owner in the system operator and the 3rd party, as defined by a name/reference that assigns responsibility for contract execution and liability
5. have zero entropy, random, globally unique identifiers to track all statistics about the contract as it transverses it lifecycle
6. contract identifiers should not be subject to sequential issue or allow an adversary to deduce any facts from them
7. be enforced such that an expired or revoked contract cannot be used
8. be subject to blacklisting where a contract can be permanently or temporarily blacklisted in the event of: abuse, security concerns or commercial impediments can be enforced by revocation Once a master contract is negotiated between the system operator and the 3rd party, its absolute definition is recorded within a secure system operator contract database. Contract Usage and status reporting shall be made against all lifecycle events, such as 1. create date,
2. date/time customer usage,
3. date/time 3rd party usage,
4. contract update, edit, revision: date/time, author, approver, change report, reason
5. blacklist status change:blacklist status set, blacklist status clear
   Revoke status change:revoke status set
6. expiration control events:expire date passed, expire date violation, blacklist usage violation attempt, revoke usage violation attempt As general principles, the invention requires that:

1. applications other than those of the system operator may request the user to approve that datasets may be drawn, under explicit contract, from the system operator Personal Library held on the pCloud.
2. websites other than those of the system operator may request the user to approve the sharing of datasets, under explicit contract, from the system operator Personal Library held on the pCloud.

Any 3rd party application or website will operate under the basic principle that a secure connection must be made by the system operator application to the personal library acting as a proxy for the 3rd party system. Only the system operator app is able to access the public CA interface of the system operator, and it will pass authentication and authorization tests before the request is allowed to be satisfied. This means that the 3rd party app/website must prove that it is a valid requestor and is making an acceptable request.

The initialisation sequence aims to ensure that offline and man-in-the-middle attacks on the system operator's app are unable to conduct valid high volume attacks. The requesting application must establish a valid CA Session_Key by making a request to the open public CAS API which grants a large 128 bit random Session_Key for use in ongoing requests.

This request should be made within a secure SSL connection, to A+ standard, with SSL certificate pinning, from a valid CA partner recorded in the CA Contract Database, and from an application that declares itself to have a valid application_id. The CAS Session Manager provides the session key to the requestor and may update the session_key into the Firewall (Access Control List) Whitelist such that for the duration of its validity the firewall may now let through requests that include this session id. This is to aid both filtering under denial of service attack and also to reduce the access window of an attacker.

The reason that an application should provide a valid application ID is to allow the system operator to police applications that are available for test and beta services from those available at production status for open public use. Only beta release client applications shall be able to access beta capable public services, whereas only full release client applications should be able to access public production services.

Since the 3rd party app or website must trigger a request to the system operator app that holds the user credentials, we specify the process by which this happens as follows.

A notification from 3rd party app to the system operator app is accepted if provided with the necessary credentials to prove it is valid, at which point the system operator app makes the request to the CA Data Request API and provides the session_id, pCloud access token, requestor and contract details. If this is a correctly formed request, the Firewall in front of the API will accept the traffic, the API will accept the contract_id and use the pCloud OAUTH credentials (or the like) to access the pCloud and execute the data request.

The notification from 3rd party app to the system operator app is triggered only once the user has approved the contract request. The notification can happen on the device 24 under Android, or IOS by an OS platform notification system that is lightweight and requires no active response from the system operator app other than acknowledge receipt of request. The same notification cycle can alternatively exist between a 3rd party website and the system operator Once all the CA request phase is successfully completed and an OAUTH token has made the pCloud accessible, the Data Query process is triggered to access the user's data and extract the data that falls within the CA Request. The query process then uses the contract to define the way in which the stored data is extracted using database queries.

Note that the contract can specify all data in all datasets, except that within each dataset the external data source [account] is qualified by an additional override that resides in the users Personal Profile. The Personal Profile is part of the user's application setup; they can edit it and configure whether individual accounts will be accessible to Consent Access. This acts as an extra protection layer and ensures that no CA contracts can extract data from accounts where the user may want to keep the data completely private. Examples include private social media accounts, where the user may have friends and close family separate, and people who may want to share personal social media accounts but also have company accounts that they keep in their library but do not want to fall under the same process.

Figure 2:
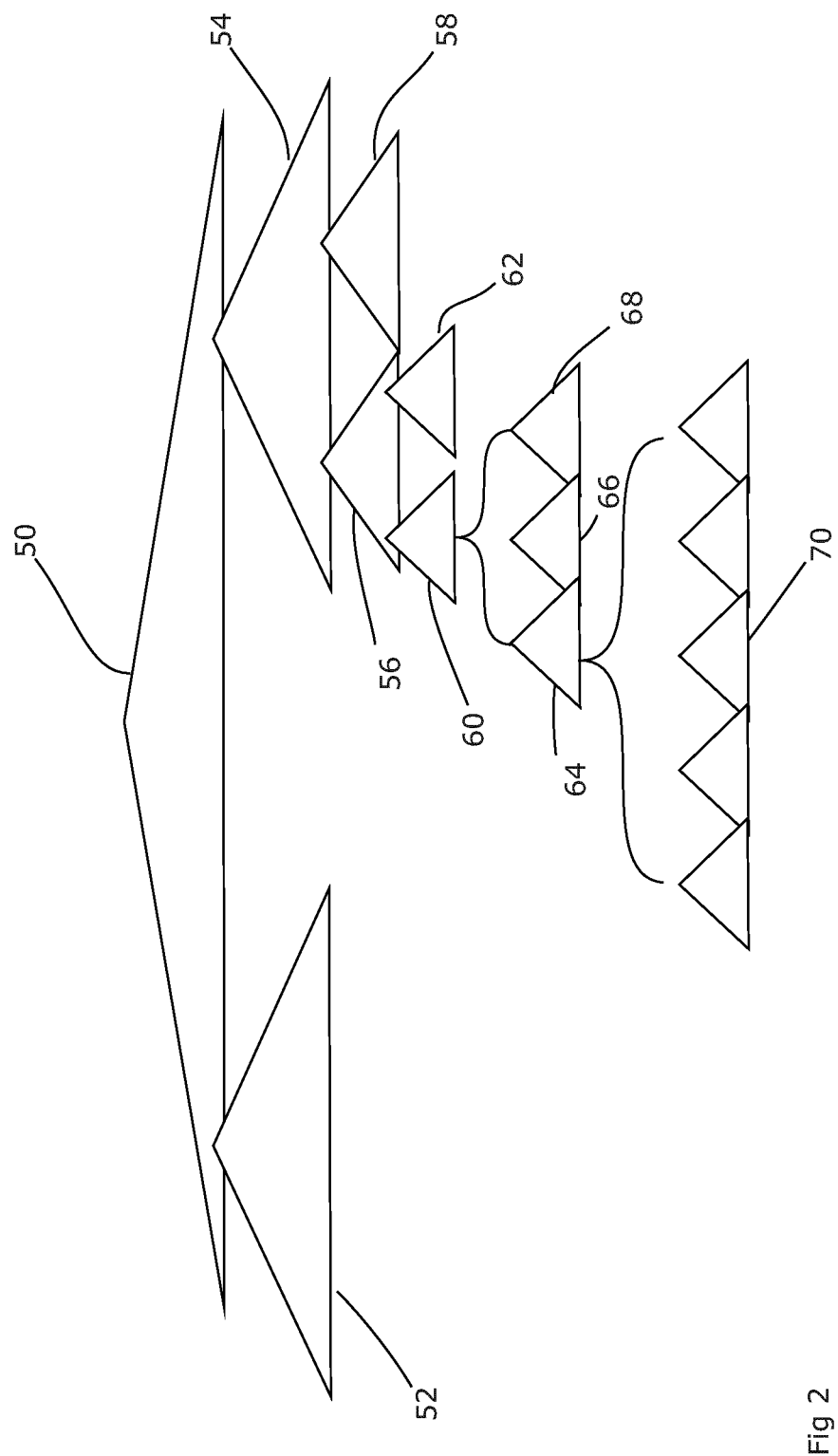
FIG. 2 shows the data object reference & organisation of the data surface.

FIG. 2 illustrates the manner in which the data is referenced within the pCloud 20. In addition to storage of the actual files themselves, a structured index file is also provided—a structure that we refer to as the "data surface". This exists as a distinct file from the data files, and holds details of the file locations and content in an ordered manner. Thus, the data surface 50 as a whole contains functional subdivisions separating the data subjects, in this case into health 52 and social media 54. Within (for example) the social media area 54, there are further source subdivisions separating different types of source within that same general data subject, such as Facebook data 56 and Twitter data 58. Within in source, the user may have granted access to more than one account 60, 62, so a further layer within the surface 50 references the different accounts.

Social media accounts usually have different data types within their data model, so the surface 50 contains a further layer which distinguishes these. Thus, the Facebook account 60 has a number of posts 64, likes 66 and media items 68. Each of these is then subdivided by date, in this case monthly 70 but finer or coarser subdivision such as by day, week, quarter, year or the like may be adopted.

Use of a data surface 50 has a number of benefits. The CAS engine 14 can process just the file data rather than having to access the files themselves, thus speeding both the file transfer to and from the CAS engine 14 and also the processing speed of the CAS engine 14 itself. This allows a more real-time process for approval of consent requests by the $3^{rd}$ party 18. It also means that the CAS engine 14 does not need to hold or to have copies of the user's data 20, only the data surface 50; this provides an important assurance for the user 22 that the system operator does not see or hold their data.

Thus, the validation of consent access requests by inspection of a data surface and not the files themselves provides a useful technical effect in bringing the processing time required down to a virtually real-time process, and also a structural difference to the consent approval process in that the system operator does not need to access the data itself.

It will of course be understood that many variations may be made to the above-described embodiment without departing from the scope of the present invention.

The invention claimed is:

1. A method for controlling the provision of information from a data store to a data recipient within constraints controlled by a user of a user device, the data store containing data generated by or relating to the user of the user device, wherein the data store, the data recipient and a data processing machine are physically separated, and the data store and the data recipient both being connectable to each other and to the data processing machine via a communications network, the method comprising the steps of:

providing, on the user device, a first application under the control of the data recipient, and a second application not under the control of the data recipient, the second application being configured to communicate with the data processing machine for validation of data requests received via the first application and to present the user with a data access consent query once data requests are validated;

forming a connection between the data store, the data recipient and the data processing machine via a communications network, wherein the connection between the data store and the data processing machine and/or between the data store and the data recipient is formed only when the second application requests such a connection to be formed and is temporary;

transmitting, from the first application, under control of the data recipient, a data request to the second application;

forwarding, by the second application, the data request to the data processing machine, the data processing machine attempting to validate the data request against a set of pre-determined rules;

when validation of the data request is successful, the data processing machine providing the data recipient with access to a defined subset of the information held in the data store, wherein providing the data recipient with access further comprises:

the data processing machine issuing a session key to the data recipient;

the data recipient using the session key to request information from the data store; and the data store interpreting the request for information and providing a list of available files according to the request for information;

and closing the connection between the data store, the data recipient and the data processing machine.

2. The method according to claim 1, wherein providing the data recipient with access further comprises:

the data recipient, from the first application and via the second application, requesting a session key from the data processing machine;

and the data recipient requesting from the data store one or more available files according to the list of available files and the request for information.

3. The method according to claim 1, wherein the user device is a portable computing device.

4. The method according to claim 1, wherein the data processing machine attempting to validate the data request further comprises the second application presenting the data request to the user via the second application for approval.

5. The method according to claim 1, wherein the data processing machine does not retain a copy of the defined subset of the information held in the data store to which access is provided to the data recipient.

6. The method according to claim 1, wherein providing the data recipient with access to the defined subset of the information held in the data store further comprises the data processing machine providing instructions to the data recipient to facilitate movement of the defined subset of the information from the data store to the data recipient.

7. The method according to claim 1, wherein the data store comprises a data surface and file storage, and wherein the data surface comprises a description of information stored in files in the file storage.

8. The method according to claim 7, wherein the data processing machine attempting to validate the data request against the set of pre-determined rules further comprises the data processing machine accessing the data surface rather than the information stored in the files in the file storage in order.

9. The method according to claim 7, wherein the data surface contains further data to describe a data source and/or credentials of the user that were used to incrementally add data to the data store.

10. The method according to claim 7, wherein the data store is part of a cloud-based storage network.

* * * * *